US005792420A

United States Patent [19]

Brezinski

[11] Patent Number: 5,792,420
[45] Date of Patent: Aug. 11, 1998

[54] METAL CORROSION INHIBITOR FOR USE IN AQUEOUS ACID SOLUTIONS

[75] Inventor: Michael M. Brezinski, The Hague, Netherlands

[73] Assignee: Halliburton Energy Services, Inc., Duncan, Okla.

[21] Appl. No.: 855,309

[22] Filed: May 13, 1997

[51] Int. Cl.[6] .................................................. C23F 11/04
[52] U.S. Cl. .............................. 422/12; 166/307; 422/7; 507/232; 507/934; 507/939
[58] Field of Search ............... 422/7, 12; 507/232, 507/903, 904, 923, 934, 939; 166/307

[56] References Cited

U.S. PATENT DOCUMENTS

| | | | |
|---|---|---|---|
| 2,758,970 | 8/1956 | Sankaitis et al. | 252/8.55 |
| 4,498,997 | 2/1985 | Walker | 252/8.55 C |
| 4,552,672 | 11/1985 | Walker | 252/8.55 C |
| 4,698,168 | 10/1987 | Briggs | 252/8.553 |
| 5,158,693 | 10/1992 | Ramanarayanan et al. | 428/660 |
| 5,336,441 | 8/1994 | Shah et al. | 422/16 |
| 5,366,643 | 11/1994 | Walker | 252/8.555 |
| 5,441,929 | 8/1995 | Walker | 507/260 |

*Primary Examiner*—Timothy McMahon
*Attorney, Agent, or Firm*—Robert A. Kent; Clark Dougherty, Jr.

[57] ABSTRACT

The present invention provides an improved metal corrosion inhibitor for use in aqueous acid solutions which is relatively non-toxic and inexpensive. The corrosion inhibitor is a mixture comprised of oligomerized aromatic amines prepared by contacting the still bottoms residue produced in the distillation of quinoline from coal tar with oxygen in the presence of a catalyst.

6 Claims, No Drawings

METAL CORROSION INHIBITOR FOR USE IN AQUEOUS ACID SOLUTIONS

BACKGROUND OF THE INVENTION

1. Field of the Invention

The present invention relates to an improved metal corrosion inhibitor for use in aqueous acid solutions.

2. Description of the Prior Art

Subterranean hydrocarbon containing formations penetrated by well bores are commonly treated with aqueous acid solutions to stimulate the production of hydrocarbons therefrom. One such treatment known as "acidizing" involves the introduction of an aqueous acid solution into the subterranean formation under pressure so that the acid solution flows through the pore spaces of the formation. The acid solution reacts with acid soluble materials contained in the formation thereby increasing the size of the pore spaces and the permeability of the formation. Another production stimulation treatment known as "fracture-acidizing" involves the formation of one or more fractures in the formation and the introduction of an aqueous acid solution into the fractures to etch the fracture faces whereby flow channels are formed when the fractures close. The aqueous acid solution also enlarges the pore spaces in the fracture faces in the formation.

In carrying out acidizing and fracture-acidizing treatments in wells and other similar treatments using aqueous acid solutions, the corrosion of metal tubular goods, pumps and other equipment is often a problem. The expense associated with repairing or replacing corrosion damaged metal tubular goods and equipment can be very high. In a well treatment utilizing an aqueous acid solution, the corrosion of metal surfaces in tubular goods and equipment results in at least the partial neutralization of the aqueous acid solution before it reacts with acid-soluble materials in the subterranean formation to be treated. Also, the presence of dissolved metals in the aqueous acid solution can bring about the precipitation of insoluble sludge when the aqueous acid solution contacts crude oil which can in turn severely damage the permeability of the subterranean formation being treated.

A variety of metal corrosion inhibiting formulations for use in aqueous acid solutions have been developed and used successfully heretofore. Many of such corrosion inhibiting formulations have included quaternary ammonium compounds as essential components, particularly in high temperature applications. However, problems have been associated with the use of quaternary ammonium compounds in that they are generally highly toxic. Further, the quaternary ammonium compounds which achieve high degrees of metal corrosion protection at high temperatures are those which have relatively high molecular weights and high degrees of aromaticity. Those quaternary ammonium compounds are not readily available commercially and are very expensive to produce. Thus, there is a need for a corrosion inhibitor which is as effective in preventing metal corrosion as quaternary ammonium compounds but is less toxic and less expensive.

SUMMARY OF THE INVENTION

By the present invention an improved metal corrosion inhibitor for use in aqueous acid solutions is provided which meets the needs described above and overcomes the deficiencies of the prior art. The improved corrosion inhibitor of this invention is a mixture comprised of oligomerized aromatic amines which are prepared by contacting the still bottoms residue produced in the distillation of quinoline from coal tar with oxygen in the presence of a catalyst at a temperature and for a time sufficient to oligomerize aromatic amines contained therein.

In addition to the mixture comprised of oligomerized aromatic amines and methods of preparing the mixture, metal corrosion inhibited aqueous acid solutions are provided by the present invention as well as methods for protecting a metal surface from corrosion when contacted by an aqueous acid solution using the improved corrosion inhibitor of this invention.

The metal corrosion inhibited aqueous acid solutions are basically comprised of water, an acid and an effective amount of a corrosion inhibitor comprised of a mixture of oligomerized aromatic amines prepared as described above. The acid utilized in the aqueous acid solutions is preferably selected from the group consisting of hydrochloric acid, hydrofluoric acid, formic acid, acetic acid, citric acid and mixtures thereof.

The methods of the invention for protecting a metal surface from corrosion when contacted by an aqueous acid solution are basically comprised of the steps of combining with the aqueous acid solution an effective amount of a corrosion inhibitor comprised of a mixture of oligomerized aromatic amines prepared as described above, and then contacting the metal surface with the aqueous acid solution containing the corrosion inhibitor.

Thus, it is a general object of the present invention to provide an improved metal corrosion inhibitor for use in aqueous acid solutions comprised of a mixture of oligomerized aromatic amines, methods of preparing the corrosion inhibitor, metal corrosion inhibited aqueous acid solutions containing the corrosion inhibitor and methods of protecting metal surfaces from corrosion when contacted by aqueous acid solutions using the corrosion inhibitor.

Other and further objects, features and advantages of the present invention will be readily apparent to those skilled in the art upon a reading of the description of preferred embodiments which follows.

DESCRIPTION OF PREFERRED EMBODIMENTS

By the present invention, a mixture comprised of oligomerized aromatic amines having relatively high molecular weights and degrees of aromaticity is provided which is useful as a metal corrosion inhibitor in aqueous acid solutions. Methods of preparing the mixture of oligomerized aromatic amines, corrosion inhibited aqueous acid solutions containing the mixture and methods of protecting metal surfaces from corrosion when contacted by an aqueous acid solution using the mixture are also provided.

Surprisingly, the mixture of oligomerized aromatic amines of this invention functions as a corrosion inhibitor in aqueous acid solutions substantially as well as a mixture of equivalent quaternary ammonium compounds, i.e., quaternary ammonium compounds having substantially the same or higher molecular weights and degrees of aromaticity as the oligomerized amines. In addition, the use of the oligomerized aromatic amines is highly beneficial as compared to the use of quaternary ammonium compounds in that the amines are less toxic and are much less costly than equivalent quaternary ammonium compounds.

The mixture of oligomerized aromatic amines of this invention is inexpensively prepared from the still bottoms residue produced in the distillation of pharmaceutical quinoline from coal tar. Such still bottoms residue contains quantities of quinoline and derivatives thereof, isoquinoline and derivatives thereof, and other aromatic amines such as pyridine, picoline, lutidine and the like and their derivatives. The quinoline still bottoms residue starting material is commercially available, for example, from the Crowley Coal Tar Products Company of New York, N.Y. under the tradename "INHIBITOR J™."

A quantity of quinoline still bottoms residue is contacted with oxygen in the presence of a catalyst, e.g., cuprous chloride in an amount in the range of from about 0.1% to about 2% by weight of the bottoms residue, at a temperature and for a time sufficient to oligomerize the aromatic amines contained therein. It is believed that the contact with oxygen causes a coupling reaction that oligomerizes the aromatic amines and thereby increases their overall molecular weights and degrees of aromaticity. The term "oligomerize" is used herein to mean the coupling of several aromatic amines together and/or to other aromatic compounds.

The contact of the quinoline still bottoms residue with oxygen is preferably carried out by sparging oxygen through the bottoms residue at a rate of from about 2 to about 30 cubic centimeters per minute per 100 milliliters of bottoms residue for a time period in the range of from about 8 hours to about 48 hours while maintaining the temperature of the bottoms residue in the range of from about 150° F. to about 225° F.

As mentioned above, the mixture of the oligomerized aromatic amines prepared as described above functions extremely well as a metal corrosion inhibitor in aqueous acid solutions, is substantially less toxic than quaternary ammonium compounds and is relatively inexpensive.

The improved metal corrosion inhibited aqueous acid solutions of this invention are comprised of water, an acid, and an effective amount of a metal corrosion inhibitor comprised of a mixture of oligomerized aromatic amines prepared from quinoline still bottoms residue as described above.

The water used to form the aqueous acid solutions of this invention can be any aqueous fluid which does not adversely react with the components of the inhibited aqueous acid solution. For example, the water can be fresh water, brine, salt solutions and the like.

The acid utilized is preferably an acid selected from the group consisting of hydrochloric acid, hydrofluoric acid, formic acid, acetic acid, citric acid and mixtures thereof. The acid is preferably present in an amount in the range of from about 2% to about 100% by weight of the acid solution, more preferably from about 5% to about 38%.

The metal corrosion inhibitor comprised of a mixture of oligomerized aromatic amines prepared as described above is present in the aqueous acid solution in an amount effective to prevent or reduce the corrosion of metal surfaces contacted by the acid solution. Preferably, the corrosion inhibitor is present in an amount in the range of from about 0.05% to about 3% by volume of the solution.

As will be understood by those skilled in the art, the metal corrosion inhibited aqueous acid solutions of this invention can include a variety of other additives such as acetylenic alcohols, various corrosion inhibitor intensifiers, sulfide scavengers, solvents, surfactants and other components commonly used in acidizing compositions and known to those skilled in the art.

The methods of this invention for protecting a metal surface from corrosion when contacted by an aqueous acid solution are basically comprised of the steps of combining an effective amount of a metal corrosion inhibitor comprised of a mixture of oligomerized aromatic amines prepared as described above with the aqueous acid solution, and then contacting the metal surface with the aqueous acid solution containing the corrosion inhibitor.

While the metal corrosion inhibitor comprised of a mixture of oligomerized aromatic amines of this invention can be combined with any aqueous acid solution used in any application to contact and dissolve reactive material so that metal surfaces also contacted by the acid solution are prevented from being corroded, the corrosion inhibitor is particularly suitable for use in aqueous acid solutions used for acidizing and fracture-acidizing subterranean formations.

In order to further illustrate the aqueous acid compositions and methods of this invention the following example is given.

EXAMPLE 1

A corrosion inhibitor comprised of a mixture of oligomerized aromatic amines of this invention was prepared by contacting 100 milliliters of quinoline still bottoms residue containing 1% by weight cuprous chloride with oxygen at a rate of about 20 cubic centimeters per minute for 24 hours at a temperature of 175° F. The still bottoms residue used was obtained from the Crowley Coal Tar Products Company under the tradename "INHIBITOR J™." A portion of the resulting mixture of oligomerized aromatic amines was combined with other components to form a first corrosion inhibiting formulation (designated as "Inhibitor A") as follows:

| Inhibitor A | |
|---|---|
| Component | Amount, % by weight of formulation |
| surfactants | 18 |
| acetylenic alcohols | 5 |
| solvents (alcohols and naphtha) | 30 |
| fatty acids | 30 |
| oligomerized aromatic amines formed from oxygen treated quinoline still bottoms residue | 17 |
| | 100 |

A second corrosion inhibitor was prepared by reacting 200 grams of quinoline still bottoms residue with 184 grams of benzylchloride in isopropyl alcohol for 8 hours at a temperature of 225° F. to form a mixture of aromatic quaternary ammonium compounds. Cuprous chloride was added to the mixture to achieve the same weight percent as in Inhibitor A. A portion of the mixture was then combined with other components to form a second corrosion inhibitor formulation (designated as "Inhibitor B") as follows:

| Inhibitor B | |
|---|---|
| Component | Amount, % by weight of formulation |
| surfactants | 18 |
| acetylenic alcohols | 5 |
| solvents (alcohols and naphtha) | 30 |
| fatty acids | 30 |
| quaternary ammonium compounds | 17 |

-continued

| Inhibitor B | |
|---|---|
| Component | Amount, % by weight of formulation |
| formed from quinoline still bottoms residue reacted with benzylchloride | 100 |

0.3 milliliter portions of Inhibitor A and Inhibitor B were combined with 100 milliliter portions of a 15% by weight aqueous hydrochloric acid solution to form an acid solution containing a concentration of 0.3% by weight corrosion inhibitor. In addition, 2 milliliter portions of Inhibitor A and Inhibitor B were combined with 100 milliliter portions of a 15% by weight aqueous hydrochloric acid solution to form acid solutions containing 2% by weight corrosion inhibitor. Test samples of the various corrosion inhibited hydrochloric acid solutions were heated to the temperatures given in Table I below and a preweighed N-80 steel corrosion coupon was immersed in each while maintaining the temperature of the samples for 4 hours. After the four hour test periods, the corrosion coupons were removed, rinsed and weighed to determine the rates of corrosion which took place during the tests.

The results of these tests are given in Table I below:

TABLE I

| Corrosion Tests | | | | | |
|---|---|---|---|---|---|
| Temper- | | Acid | Corrosion Inhibitor | Corrosion Rate, lb/sq. ft. | |
| ature, °F. | Time, Hours | Sol. Used | Concentration, % by weight | Inhibitor A | Inhibitor B |
| 200 | 6 | 15% HCl | 0.3[1] | 0.026 | 0.025 |
| 250 | 6 | 15% HCl | 0.3 | 0.015 | 0.011 |
| 300 | 6 | 15% HCl | 2.0 | 0.055 | 0.064 |

[1]Contained 2% by weight of an ethoxylated amine dispersant and 2% by weight of an antisludging formulation containing dodecylbenzene sulfonic acid.

From the above test results, it can be seen that the corrosion inhibitor of the present invention comprised of oligomerized aromatic amines provides metal corrosion protection to aqueous acid solutions substantially as well as a mixture of quaternary ammonium compounds formed from the same still bottoms residue starting material.

Thus, the present invention is well adapted to carry out the objects and attain the ends and advantages mentioned as well as those which are inherent therein. While numerous changes can be made by those skilled in the art, such changes are encompassed within the spirit of this invention as defined by the appended claims.

What is claimed is:

1. A method of protecting a metal surface from corrosion when contacted by an aqueous acid solution comprising the steps of:

combining with said aqueous acid solution an effective amount of a metal corrosion inhibitor comprising a mixture of oligomerized aromatic amines prepared by contacting the still bottoms residue produced in the distillation of quinoline from coal tar with oxygen in the presence of a catalyst at a temperature and for a time sufficient to oligomerize aromatic amines contained therein; and contacting said metal surface with said aqueous acid solution containing said corrosion inhibitor.

2. The method of claim 1 wherein said aqueous acid solution contains an acid selected from the group consisting of hydrochloric acid, hydrofluoric acid, formic acid, acetic acid, citric acid and mixtures thereof present in said aqueous acid solution in an amount in the range of from about 2% to about 100% by weight of water in said solution.

3. The method of claim 2 wherein said metal corrosion inhibitor is combined with said aqueous acid solution in an amount in the range of from about 0.05% to about 3% by volume of said solution.

4. The method of claim 1 wherein said catalyst is cuprous chloride present in said still bottoms residue in an amount in the range of from about 0.1% to about 2% by weight of said bottoms residue.

5. The method of claim 4 wherein said still bottoms residue is contacted with said oxygen at a rate in the range of from about 2 to about 30 cubic centimeters per minute per 100 milliliters of bottoms residue, and at a temperature in the range of from about 150° F. to about 225° F.

6. The method of claim 5 wherein said still bottoms residue is contacted with said oxygen for a time period in the range of from about 8 hours to about 48 hours.

* * * * *